(12) United States Patent
Lecompte

(10) Patent No.: US 8,996,027 B2
(45) Date of Patent: Mar. 31, 2015

(54) MOBILE RADIO COMMUNICATIONS DEVICE, RELATED NETWORK DEVICE AND METHOD

(75) Inventor: David Lecompte, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 279 days.

(21) Appl. No.: 12/450,436

(22) PCT Filed: Mar. 27, 2008

(86) PCT No.: PCT/JP2008/056652
§ 371 (c)(1),
(2), (4) Date: Sep. 25, 2009

(87) PCT Pub. No.: WO2008/123580
PCT Pub. Date: Oct. 16, 2008

(65) Prior Publication Data
US 2010/0048207 A1   Feb. 25, 2010

(30) Foreign Application Priority Data

Mar. 28, 2007   (GB) .................................. 0705974.4

(51) Int. Cl.
*H04W 24/00* (2009.01)
*H04M 11/04* (2006.01)
(Continued)

(52) U.S. Cl.
CPC ........... *H04W 60/04* (2013.01); *H04J 11/0069* (2013.01)
USPC ..................................... 455/456.1; 455/404.1

(58) Field of Classification Search
CPC ..... H04W 64/00; H04W 4/02; H04W 76/007; H04W 4/22; H04L 25/08; H04L 1/00; H04L 2001/00
USPC ................................. 455/456.1–456.6, 435.1
See application file for complete search history.

(56) References Cited

U.S. PATENT DOCUMENTS

| 2004/0192305 A1* | 9/2004 | Namiki et al. ............. 455/435.1 |
| 2006/0105777 A1 | 5/2006 | Shinozaki |
| 2008/0096556 A1* | 4/2008 | Shinozaki .................. 455/435.1 |

FOREIGN PATENT DOCUMENTS

| JP | 2001-078249 A | 3/2001 |
| JP | 2004-289689   | 10/2004 |

(Continued)

OTHER PUBLICATIONS

Partial translation of the office action issued for the Japanese Patent Application on May 29, 2012; cited literature 1.*

(Continued)

*Primary Examiner* — Michael Faragalla
(74) *Attorney, Agent, or Firm* — McGinn IP Law Group, PLLC

(57) ABSTRACT

The present invention provides for a mobile radio communications device arranged for operation within a mobile radio communications network comprising a plurality of location areas each comprising a plurality of cells, the device including means for identifying an approaching border of an area with a neighbouring area, triggering means for triggering location update signalling from the device and to reflect a change in area responsive to the identification of the said border, and the device further including delaying means for delaying transmission of a location update signalling such that, particularly if a random delay is employed, the cell traffic load can be spread out in time and its required location.

23 Claims, 1 Drawing Sheet

Figure 1:
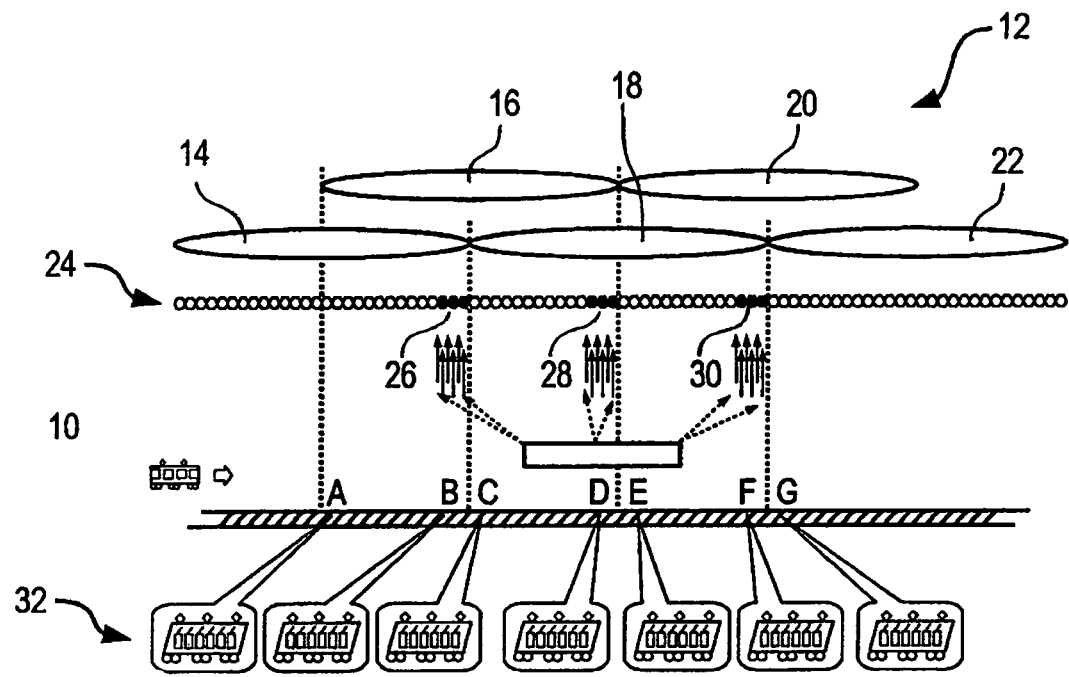

(51) Int. Cl.
*H04W 60/04* (2009.01)
*H04J 11/00* (2006.01)

(56) References Cited

FOREIGN PATENT DOCUMENTS

| | | | |
|---|---|---|---|
| JP | 2004-289689 A | 10/2004 | |
| JP | 2006-128897 | 5/2006 | |
| JP | 2006-128897 A | 5/2006 | |
| JP | 2006-279381 A | 10/2006 | |
| JP | 2007-53524 A | 3/2007 | |

OTHER PUBLICATIONS

Japanese Office Action dated May 29, 2012 with a partial English Translation thereof.
Japanese Office Action dated Jul. 9, 2013 with partial English translation thereof.

* cited by examiner

MOBILE RADIO COMMUNICATIONS DEVICE, RELATED NETWORK DEVICE AND METHOD

The present invention relates to a mobile radio communications device, a mobile radio communications network device, and to a related method of controlling the operation thereof.

It is known that mobile radio communications traffic varies greatly across, for example, a cellular network and some cells within the network may be experiencing high traffic loads, whereas other cells will be experiencing low traffic loads.

High traffic loads, and the manner in which they arise, can prove disadvantageous for a cell insofar as service level can be restricted and, in severe cases, service failure can be experienced.

A sudden change to a high traffic load can, in particular, emphasise and exaggerate such problems and limitations.

Thus, such service limitations can arise in scenarios in which the volume of cell traffic increases by large order of magnitude virtually simultaneously and such situations can arise when subscribers are moving between cells, or at least the locational areas containing such cells, substantially simultaneously.

One example of such a mass-movement scenario occurs in relation to urban transport systems and for example arises from movement within a public transport system, such as for example a train with a large number of passengers on board and travelling to/from a particularly densely populated urban area particularly during peak hours of travel such as at the beginning, or end, of a working day.

In further detail, when a mobile radio communications device such as User Equipment (UE) terminal is in idle mode, it is quite commonly placed in a state in which it will not report its location each time a different cell selection is made. Rather, only when the terminal selects a cell that does not belong to an area where the UE is currently located will it report its new location, and according to current knowledge from the network.

In order for each terminal and the network to share the knowledge of the location of the terminal it is found that the network operator will commonly partition all cells into areas (called either "location area", "routing area", "registration area", "tracking area" etc), so that each cell belongs to one of these areas. Further the cell broadcasts this information (i.e. a location area identity) to terminals that select this cell.

Thus when the terminal goes idle (after initial contact with the network at power on/after active transmissions), the terminal reports its location e.g. using cell identity, location area identity(ies) that are broadcast in this cell, and the network indicates in reply where it expects the terminal to be (one or more location areas, one or more cells). When the terminal moves out of this area in which it is expected to be, it again makes contact with the network.

In simplified network deployments, i.e. with each cell belonging to one location area, and each terminal known to be in one location area, when for example a train crosses the border between two location areas, a large number of terminals will try to contact the network simultaneously in the same cell. In highly dense urban areas such as in Tokyo, this can cause service outage not only for users in the train, but also for all users in that cell.

In an attempt to limit this problem, one technique already proposed is to localise terminals in the same place in areas with different geographical extensions, so that for example when the train enters a new cell, only a subgroup of terminals will have moved out of their known locations, so that the load then arising due to location update is limited. This effect can be obtained by either defining overlapping location areas or allocating several tracking areas to one terminal. Then, assuming that all users in the train are split into X groups, the load when the terminal enters the cell is then divided by X and so reduced.

However, limitations and disadvantages still remain for the operator for example, the operator will have to handle specific groups of terminals and if it seeks to achieve this dynamically according to location this will create additional complexity. Alternatively, if it seeks to achieve this statically (i.e. in which groups depend on terminal/subscriber identity), it will have to define many groups in order to cope with possible worst load situations.

Further, it remains a problem should a group of users simultaneously try to contact the same cell.

The present invention seeks to provide for a mobile radio communications device, related mobile radio communications network device, and methods of operation having advantages over known such devices and methods.

According to a first aspect of the present invention there is provided a mobile radio communications device arranged for operation within a mobile radio communications network comprising a plurality of location areas each comprising a plurality of cells, the device including means for identifying an approaching borer region of an area with a neighbouring area, triggering means for triggering location update signalling from the device and to reflect a change in area responsive to the identification of the said border, and the device further including delaying means for delaying transmission of the location update signalling.

The present invention proves advantageous since, through use of the delaying means even when a large number of subscribers moves into a new cell area, the delaying means advantageously serves so as to spread the manner in which the UEs of that large number of subscribers will provide location update signalling.

In this manner, a cell-overload situation can advantageously be avoided.

As a further advantage, the device can be arranged such that the triggering of the location update signalling occurs before the device crosses the said border into the neighbouring area.

As a further advantage, the means for delaying the transmission of the location update signalling can be arranged to delay the said triggering.

In accordance with a particular advantageous mode of operation, the means for delaying the transmission of the location update signalling is arranged to comprise a random delay means offering a random delay.

Yet further, the range in potential random delay can be restricted by means of a predetermined maximum delay value.

Preferably, the maximum random delay value can be determined in accordance with a standard serving to specify a network technology.

The maximum random delay value can comprise a fixed value for all terminals in a network.

In one example, the maximum value can comprise a fixed value for all terminals in a network, and/or in a location area.

Yet further, the maximum value can depend on terminal mobility, such as indicated by rate of cell reselections/location area change. In this matter, one value can be provided for high mobility terminals, and another value for low mobility terminals.

Alternatively, if the maximum random time value is not fixed, then its value(s) or the parameters for the terminal to determine it (e.g. from terminal mobility) can be provided to the terminal.

Such information can be provided for example by broadcast information from cells in an area, and either to all terminals or group of terminals. Alternatively, it can be provided individually to a terminal at the time of attachment to the network and at location update.

Yet further one or several methods can be used in the terminal to determine that it has entered the border region of the area where it is known to be in by the network.

For example, at location update; if the network indicates multiple location areas to the terminal, it can be arranged to indicate a subset which are located at the border.

Also, at location update, the network can provide information that allows the terminal to identify cells that belong to the border region, for example cell identity(ies) of "border cells", bit mask(s) to identify border cells from cell identity and cell identity(ies) of "centre cell", distance(s) of 'border cell' identity to "centre cell" (value and algorithm, e.g. absolute value of different, Hamming distance, etc).

In particular, cells that belong to the border of a location area indicate this by a special bit in broadcast information.

According to another aspect of the present invention there is provided a method of controlling operation of a mobile radio communications device within a network comprising a plurality of location areas each comprising a plurality of cells, the method including the steps of identifying an approaching border of an area with a neighbouring area, triggering location update signalling from the device to reflect a change in area and responsive to the identification of the approaching border, and delaying the transmission of the location update signalling.

As with the device discussed above, the method of the present invention proves advantageous since, through use of the delaying means, even when a large number of subscribers moves into a new cell area, the delaying means advantageously serves to spread the manner in which the UEs of that large number of subscribers will provide location update signalling.

A cell-overload situation can advantageously be avoided with the method of the present invention.

Advantageously, the triggering of the location update signalling occurs before the device crosses the said border into the neighbouring area.

The delay in the transmission of the location update signalling can comprise the step of delaying the said triggering.

As above, the delay can comprise a random delay.

Again, the range in potential random delay can be restricted y means of a predetermined maximum delay value.

The maximum random delay value can be determined and signalled as outlined above.

According to a yet further aspect of the present invention there is provided a mobile radio communications network device arranged for operation within a mobile radio communications network comprising a plurality of location areas each comprising a plurality of cells, and including means for indicating to a mobile radio communications device such as that defined above that it has entered a border region of an area where it is known to be located by the network.

Preferably, such indication can be provided at location update and if the network indicates multiple location areas to the mobile radio communications device, the network device can indicate a subset which are located at the boarder.

Alternatively at location update, the network can provide information that allows the mobile radio communications device to identify cells that belong to the border, for example by way of cell identity(ies) for "border cells", bit mask(s) to identify border cells from cell identity, and cell identity(ies) of "centre cell", distance(s) of 'border cell' identity to "centre cell" (value and algorithm, e.g. absolute value of different, Hamming distance, etc).

As will therefore be appreciated, the present invention advantageously provides for randomisation, in time and location, of location update procedures for a mobile radio communications device whilst not disadvantageously affecting the quality of service.

Location of update information within a cellular network can therefore be provided in a controlled, and albeit possibly random, manner so as to ease or prevent potential congestion when a large number of subscribes move almost simultaneously into a new cell/area, for example when travelling together by train.

The invention can prove particularly advantageous in highly populated areas where it is likely that a large number of full passenger trains will be moving simultaneously.

Figure 2:
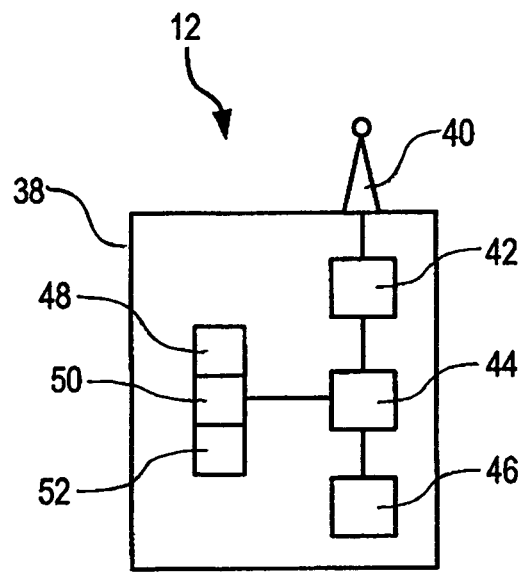

The invention is described further hereinafter, by way of example only, with reference to the accompanying drawings in which:

FIG. 1 is a schematic illustration of the movement of a relatively large number of subscribers through different locational areas; and FIG. 2 is a schematic diagram of a mobile radio communications device according to an embodiment of the present invention.

Turning first to FIG. 1, there is illustrated, in schematic form, the passage of a commuter train 10 through, for example a highly populated urban region 12 which has a network exhibiting a number of overlapping location areas 14-22, each of which location areas 14-22 contains a number of different cells 24 of a cellular communications network.

As will be appreciated from the above, and from the following description, it is important that when a UE terminal is located in the region of the border between two of the location areas 14-22, and in particular when the UE moves into such a border region, the cells 24 in the vicinity of that border region are readily identifiable to the UE.

In the illustrated example, three cells in each of border regions 26, 28 and 30 are illustrated with the cells 26 being located within the locational area 14 but in the region of the border with neighbouring locational area 18; the cells 28 being located within locational area 16 but in the border region with location area 20; and cells 30 being located within the locational area 18 but in the region of the border with neighbouring location area 22.

The illustration of the present invention presented in FIG. 1 involves a scenario within which the train 10, which can comprise a highly packed commuter train, travels in the direction indicated by its arrow so as to pass through areas defined by the cells 24 at various location areas 14-22.

During its journey, the train 10 reaches different locational positions six A-G of which are illustrated.

The passage of the train 10 at these locational positions A-G is indicated by the representations 32 within FIG. 1 wherein each of the representations 32 of the train 10 includes an indication of a variety of UE devices 34 belonging to commuters on the train 10.

The passage of the train through the urban area illustrated in FIG. 1, and in particular from a locational positions A-G is now discussed further with reference to each of those locational positions.

For the purpose of illustrations provided by FIG. 1, it is assumed that each of the UE devices 34 belonging to the commuters within the train 10 is in an idle mode.

First, at location A the UE devices 34 are each known by the network to be connected to cells 24 within location area 14 and so no need for location update signalling arises. However, as the train 10 moves, such movement of course possibly occurring at high speed, to locational position B, the UE devices 34 can identify through the above mentioned signalling with the network that they are located within cells 26 in the boarder region between the location area 14 and the location area 18.

At this time, and through such identification of its position within the border region 26, each of the UE devices 34 is arranged to initiate location update signalling but, with a random delay element included as noted above.

Thus, as the UE devices 34 move from location B, into location C within location area 18 rather than all such devices providing location update signalling simultaneously, thereby leading to a potential service-failure scenario within the cells of location area 18, the aforementioned delay serves to effectively spread the signalling in time and location so as to avoid an instantaneous surge in cell-traffic.

A similar scenario arises again as the train 10 continues on its journey indicated by its arrow and as it approaches locational position D at which it is identified that it is located within cells 28 belonging to a border region within location area 16, but bordering with its neighbouring location area 20.

The random delay introduced into the signalling of the location update information again serves effectively to spread the signalling load at the time that the UE devices 34 are likely to change their location from a serving locational area 16 to a cellular locational area 20.

A further repeat of this scenario arises in relation to the ongoing passage of the train 10 between location positions F and G and the random relate to the signalling that can arise once it has identified that the UE devices 34 are located within the cells found within the border region of location area 18 with its neighbouring location area 22.

It should of course be appreciated that the embodiment of the present invention illustrated in FIG. 1 comprises a situation in which location areas are found to be overlapping and in which the network is arranged to provide indication of the cells 26, 28, 30 that effectively border the new location area that will be assigned to the UE device 34 at the time of location area update signalling.

As an alternative however, and for example within a scenario in which registration to multiple non-overlapping location areas is employed, as an alternative to registration to one locational area which have lapsed with others, the UE device 34 will exhibit the exact same behaviour as described above but by defining smaller location areas which could, for example, match each of the location areas illustrated by the border regions there found in FIG. 1.

Turning now to FIG. 2, there is provided, in illustrated schematic form, an illustration of a mobile radio communications device according to an embodiment of the present invention.

The mobile radio communications device 36 comprises a cell phone handset 38 including an antenna 40 and standard reception/transmission circuitry 42, processing circuitry 44, and memory means 46.

In accordance with an embodiment of the present invention, there is further provided an identification module 48 serving to provide for identification, or acknowledgement, of an approaching border region of a location area within which the handset 34 is located and which can be responsive to network signalling serving to identify such border region.

The handset 38 further includes means for triggering location update signalling when it is determined that change to a different, i.e. neighbouring, location area is required. Importantly, the handset 38 further includes delaying means 52 which, preferably in a random manner, serves to delay the actual transmission of the location update signalling in an attempt to avoid a traffic-overload condition arising as the location update signalling is provided from the handset 38; and of course the handsets (not shown) belonging to a large number of other network-subscribers who are likely to change location area at the same time as the illustrated handset 38.

It will be appreciated from the above that the present invention provides for a mobile radio communications device, a mobile radio communications network device and related method of control, in which a mobility-triggered location area update signalling can be provided. Such signalling being provided while the UE device is still within an area in which the network expects to find it and, in particular, the mobility-triggered location area update signalling is randomised in time without leading to any loss of service.

Signalling from a mobile radio communications network device advantageously serves to identify cells which are to be found within a region bordering two or more location areas.

It should be appreciated that the present invention finds ready employment within LTE terminals, MMEs and eNBss and also UMTS terminals, RNCs and SGSNs.

The invention claimed is:

1. A mobile radio communications device arranged for operation within a mobile radio communication network comprising a plurality of location areas each comprising a plurality of cells, the device including:
   a unit that identifies an approaching border region of an area with a neighboring area;
   a triggering unit that triggers location update signaling from the device to reflect a change in area responsive to the identification of the border; and
   a delaying unit that delays transmission of the location update signaling,
   wherein said delaying unit includes a random delay unit that determines autonomously a random delay as a delay of said delaying unit in said transmission of the location update signaling, and
   wherein, in the location update signaling, the mobile radio communication network provides information that allows the mobile radio communications device to identify cells that belong to the border by at least one of a cell identity for border cells, a bit mask to identify the border cells from the cell identity, a cell identity of a center cell, and a distance of the border cells to the center cell.

2. A device as claimed in claim 1, wherein the triggering of the location update signaling occurs before the device crosses the border into the neighboring area.

3. A device as claimed in claim 1, wherein the unit that delays the transmission of the location update signaling delays the triggering.

4. A device as claimed in claim 1, wherein a range in potential random delay is restrictable by a predetermined maximum delay value.

5. A device as claimed in claim 4, wherein the random delay unit receives a maximum random time value or a parameter for determination of the maximum delay value.

6. A device as claimed in claim 5, wherein the random delay unit receives the maximum random time by way of broadcast information from cells in one of the location areas.

7. A method of controlling operation of a mobile radio communications device within a mobile radio communication network comprising a plurality of location areas each comprising a plurality of cells, said method including:
- identifying an approaching border of an area with a neighboring area;
- triggering location update signaling from the device to reflect a change in area and responsive to the identification of the approaching border; and
- delaying transmission of the location update signaling,
- wherein said mobile radio communications device determines autonomously a random delay as a delay of said transmission of the location update signaling, and
- wherein, in the location update signaling, the mobile radio communication network provides information that allows the mobile radio communications device to identify cells that belong to the border by at least one of a cell identity for border cells, a bit mask to identify the border cells from the cell identity, a cell identity of a center cell, and a distance of the border cells to the center cell.

8. A method as claimed in claim 7, wherein the triggering of the location update signaling occurs before the device crosses the border region into the neighboring area.

9. A method as claimed in claim 7, wherein the transmission of the location update signaling is delayed by a delay in the triggering.

10. A method as claimed in claim 7, further comprising defining and employing a predetermined maximum delay value.

11. A method as claimed in claim 10, wherein the maximum random delay value is determined in accordance with a standard serving to specify a network technology.

12. A method as claimed in claim 11, wherein the maximum random delay value comprises a fixed value for all mobile radio communications devices in the network.

13. A maximum as claimed in claim 11, wherein the maximum random delay value is depending on a mobility of the mobile radio communications device, and
- wherein a rate of cell reselection to the area change is employed to include the mobility.

14. A method as claimed in claim 11, wherein the maximum random delay value is not fixed, and
- wherein the maximum random delay value or a parameter for the determination of the value is given to the mobile radio communications device.

15. A method as claimed in claim 14, wherein the value or parameter is included in broadcast information cells in one of the location areas.

16. A method as claimed in claim 7, wherein a determination of a proximity to a border region is made at the location update signaling.

17. A method as claimed in claim 16, wherein the network indicates a subset location area which is in a border region.

18. A mobile radio communications network device including a unit that indicates to a mobile radio communications device as claimed in claim 1, that it has entered a border region of an area where it is known to be located by the network.

19. A network device as claimed in claim 18, wherein the indication is provided at a time of location update.

20. A network device as claimed in claim 19, further comprising indicating a subset of location areas in a border region, if the network indicates multiple location areas to the mobile radio communications device.

21. A network device as claimed in claim 1, wherein the information comprises at least one the of the cell identity of the border cells and the bit mask to identify the border cells from the cell identity.

22. A mobile radio communications device arranged for operation within a mobile radio communication network comprising a plurality of location areas each comprising a plurality of cells, the device including:
- means for identifying an approaching border region of an area with a neighboring area;
- triggering means for triggering location update signaling from the device to reflect a change in area responsive to the identification of the border; and
- delaying means for delaying transmission of the location update signaling,
- wherein said delaying means includes random delay means for determining autonomously a random delay as a delay of said delaying means in said transmission of the location update signaling, and
- wherein, in the location update signaling, the mobile radio communication network provides information that allows the mobile radio communications device to identify cells that belong to the border by at least one of a cell identity for border cells, a bit mask to identify the border cells from the cell identity, a cell identity of a center cell, and a distance of the border cells to the center cell.

23. A mobile radio communications device arranged for operation within a mobile radio communication network comprising a plurality of location areas each comprising a plurality of cells, the device including:
- a unit that identifies an approaching border region of an area with a neighboring area;
- a triggering unit that triggers location update signaling from the device to reflect a change in area responsive to the identification of the border; and
- a delaying unit that delays transmission of the location update signaling,
- wherein said delaying unit includes a random delay unit that determines autonomously a random delay as a delay of said delaying unit in said transmission of the location update signaling, and
- wherein, in the location update signaling, the mobile radio communication network provides information that allows the mobile radio communications device to identify cells that belong to the border by any combination of a cell identity for border cells, a bit mask to identify the border cells from the cell identity, a cell identity of a center cell, and a distance of the border cells to the center cell.

* * * * *